United States Patent
Nakajima et al.

(10) Patent No.: US 9,760,497 B2
(45) Date of Patent: Sep. 12, 2017

(54) HIERARCHY MEMORY MANAGEMENT

(71) Applicant: HITACHI, LTD., Tokyo (JP)

(72) Inventors: Akio Nakajima, Santa Clara, CA (US); Akira Deguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/050,902

(22) Filed: Feb. 23, 2016

(65) Prior Publication Data

US 2016/0170895 A1 Jun. 16, 2016

Related U.S. Application Data

(63) Continuation of application No. 13/628,363, filed on Sep. 27, 2012, now Pat. No. 9,304,828.

(51) Int. Cl.
| | |
|---|---|
| *G06F 12/08* | (2016.01) |
| *G06F 3/06* | (2006.01) |
| *G06F 9/50* | (2006.01) |
| *G06F 13/16* | (2006.01) |
| *G06F 12/0893* | (2016.01) |
| *G06F 12/0813* | (2016.01) |

(Continued)

(52) U.S. Cl.
CPC ........ *G06F 12/0893* (2013.01); *G06F 3/0604* (2013.01); *G06F 3/067* (2013.01); *G06F 3/0631* (2013.01); *G06F 9/5077* (2013.01); *G06F 12/0813* (2013.01); *G06F 12/0868* (2013.01); *G06F 12/0871* (2013.01); *G06F 13/1663* (2013.01); *G06F 2212/604* (2013.01)

(58) Field of Classification Search
None
See application file for complete search history.

(56) References Cited

U.S. PATENT DOCUMENTS

| | | |
|---|---|---|
| 6,789,152 B2 | 9/2004 | Hoese et al. |
| 7,849,272 B2 | 12/2010 | Kalmuk et al. |
| 8,595,313 B2 | 11/2013 | Weber et al. |

(Continued)

FOREIGN PATENT DOCUMENTS

| | | |
|---|---|---|
| WO | 2009/113553 A1 | 9/2009 |

OTHER PUBLICATIONS

Denning, Peter J., Virtual Memory, Sep. 1970, Computing Surveys, vol. 2, No. 3, 37 pages (pp. 153-189).

(Continued)

*Primary Examiner* — Gary W Cygiel
(74) *Attorney, Agent, or Firm* — Mattingly & Malur, PC

(57) ABSTRACT

In one embodiment, a storage system comprises: a first type interface being operable to communicate with a server using a remote memory access; a second type interface being operable to communicate with the server using a block I/O (Input/Output) access; a memory; and a controller being operable to manage (1) a first portion of storage areas of the memory to allocate for storing data, which is to be stored in a physical address space managed by an operating system on the server and which is sent from the server via the first type interface, and (2) a second portion of the storage areas of the memory to allocate for caching data, which is sent from the server to a logical volume of the storage system via the second type interface and which is to be stored in a storage device of the storage system corresponding to the logical volume.

20 Claims, 21 Drawing Sheets

(51) Int. Cl.
*G06F 12/0868* (2016.01)
*G06F 12/0871* (2016.01)

(56) References Cited

U.S. PATENT DOCUMENTS

| | | | |
|---|---|---|---|
| 2004/0143718 A1* | 7/2004 | Chen | G06F 11/1666 |
| | | | 711/202 |
| 2006/0190552 A1* | 8/2006 | Henze | H04L 29/12009 |
| | | | 709/216 |
| 2009/0144388 A1 | 6/2009 | Gross et al. | |
| 2009/0292861 A1 | 11/2009 | Kanevsky et al. | |
| 2010/0329092 A1 | 12/2010 | Ueno et al. | |

OTHER PUBLICATIONS

Japanese Office Action received in corresponding Japanese Application No. 2013-175445 dated Aug. 16, 2016.

* cited by examiner

| Device discovery Table 17 | | |
|---|---|---|
| ~91 | ~92 | ~93 |
| Remote Device | Mem Type | discovered Capacity |
| N/A | DRAM | 0x10_0000 |
| Device A | Flash | 0x4000_0000 |

FIG. 10

| Address Mapping Table 16 | | | |
|---|---|---|---|
| Virtual Memory address ~101 | Remote Device ~102 | Mem Type ~103 | Physical Memory address ~104 |
| 0x1000 to 0x1999 | N/A (local) | DRAM | 0x5000 to 0x5999 |
| 0x2000 to 0x3999 | Device A | Flash | 0x1000 to 0x2999 |

FIG. 11

Memory Partition Table 26

| Physical Memory address ~111 | Mem Type ~112 | Partition Type ~113 | Remote Device ~114 |
|---|---|---|---|
| 0x5000 to 0x5999 | DRAM | Storage Cache | N/A |
| 0x6000 to 0x7999 | DRAM | Server Memory | Server 0 |
| 0x1000 to 0x2999 | Flash | Server Memory | Server 0 |
| 0x3000 to 0x6999 | Flash | Server Memory | Server 1 |
| 0x7000 to 0x8999 | Flash | Storage Cache | N/A |

FIG. 12

| Server memory allocate Table27 | | |
|---|---|---|
| Remote Device (121) | Mem Type (122) | Allocated Physical Address (123) |
| Server 0 | DRAM | 0x0000 to 0x0999 |
| Server 1 | Flash | 0x1000 to 0x2999 |

FIG. 13

HIERARCHY MEMORY MANAGEMENT

BACKGROUND OF THE INVENTION

The present invention relates generally to storage systems and, more particularly, to hierarchy memory management between server and storage system using RDMA (Remote Direct Memory Access) technology.

Remote memory access and allocation technology such as RDMA (Remote Direct Memory Access) is available. One approach involves dynamic memory management in an RDMA context (see, e.g., U.S. Pat. No. 7,849,272). Another approach involves distributed shared memory on a plurality of computers (see, e.g., US2009/0144388). Server attached PCI-Express™ flash is cheaper bit cost than large capacity RDIMM (Registered Dual Inline Memory Module) module.

A server has limited physical memory capacity which depends on the CPU architecture. To expand the capacity of Server DRAM (Direct Random Access Memory), RDIMM (Registered Dual Inline Memory Module) is required. Large capacity RDIMM is highest cost of any other DIMM type. Server DIMM socket is not hot swappable. To expand the memory capacity of the server, the server administrator stops the OS (Operation System) and stops power to the server, and then the server administrator installs DIMM to DIMM slot of the motherboard.

Local server memory provides higher performance than remote memory access by RDMA (Remote Direct Memory Access), since DDR SDRAM (Double-Data-Rate Synchronous Dynamic Random Access Memory) interface has higher access latency and capacity of network throughput than RDMA network. DRAM has lower access latency than flash memory. Conventional technology does not disclose (1) which type of local memory or remote memory is better hierarchy for performance and (2) which type of DRAM, flash memory, or other new memory device has the best hierarchy of DRAM memory tier. Also, current memory allocation of RDMA protocol does not provide memory type information.

Cache memory of storage system constitutes DRAM and/or flash memory. Current storage system does not share memory of storage system as both of storage cache and server memory expansion.

BRIEF SUMMARY OF THE INVENTION

Exemplary embodiments of the invention provide a server that manages local and remote memory and hierarchy. A storage manages a server allocation memory region. The storage manages partitioning of DRAM or Flash memory between storage cache data area and server memory data. Both the server and the storage have remote memory interface and storage block I/O interface. The server has remote hierarchy cache management to allocate or de-allocate local or remote physical address space. The storage manages to allocate cache data area and server memory data. As such, the server manages the hierarchy memory and it is easier to expand the server memory area without the host OS (Operating System) stopping. Furthermore, the storage provides memory space as server memory data and consolidates server memory resources to physical memory pool of multiple storages.

In accordance with an aspect of the present invention, a storage system comprises: a first type interface being operable to communicate with a server using a remote memory access; a second type interface being operable to communicate with the server using a block I/O (Input/Output) access; a memory; and a controller being operable to manage (1) a first portion of storage areas of the memory to allocate for storing data, which is to be stored in a physical address space managed by an operating system on the server and which is sent from the server via the first type interface, and (2) a second portion of the storage areas of the memory to allocate for caching data, which is sent from the server to a logical volume of the storage system via the second type interface and which is to be stored in a storage device of the storage system corresponding to the logical volume.

In some embodiments, the controller is operable to manage capacity information for each media type of the memory in the storage system. The memory includes at least one of DRAM memory or Flash memory. The controller is operable to manage (3) a third portion of storage areas of the memory to allocate for storing data, which is to be stored in a physical address space managed by an operating system on another server and which is sent from said another server via the first type interface, and to manage the second portion of the storage areas of the memory to allocate for caching data, which is sent from said another server to a logical volume of the storage system via the second type interface and which is to be stored in a storage device of the storage system corresponding to the logical volume. The controller is operable to provide, to the server in response to a request from the server, capacity information for each media type of the first portion of storage areas of the memory in the storage system.

In specific embodiments, the controller is operable, if a remote memory interface of the server for communicating with the first type interface is stopped, to remove the server from an entry of a server memory allocate table which stores information on allocated memory by the storage system for one or more servers. The controller is operable, in response to a remote memory binding request with one of required capacity and memory performance or memory assign location range of the first portion of storage areas of the memory from the server, to return memory binding result with mapped address information to the server. The controller is operable, in response to a remote free request from the server, to remove the server from an entry of a server memory allocate table which stores information on allocated memory by the storage system for one or more servers.

Another aspect of the invention is directed to a method of memory management for a storage system having a first type interface being operable to communicate with a server using a remote memory access, a second type interface being operable to communicate with the server using a block I/O (Input/Output) access, and a memory. The method comprises managing (1) a first portion of storage areas of the memory to allocate for storing data, which is to be stored in a physical address space managed by an operating system on the server and which is sent from the server via the first type interface, and (2) a second portion of the storage areas of the memory to allocate for caching data, which is sent from the server to a logical volume of the storage system via the second type interface and which is to be stored in a storage device of the storage system corresponding to the logical volume.

In some embodiments, the method further comprises removing the server from an entry of a server memory allocate table which stores information on allocated memory by the storage system for one or more servers, if a remote memory interface of the server for communicating with the first type interface is stopped or if a remote free request is received from the server.

Another aspect of this invention is directed to a computer-readable storage medium storing a plurality of instructions for controlling a data processor to manage memory for a storage system having a first type interface being operable to communicate with a server using a remote memory access, a second type interface being operable to communicate with the server using a block I/O (Input/Output) access, and a memory. The plurality of instructions comprise instructions that cause the data processor to manage (1) a first portion of storage areas of the memory to allocate for storing data, which is to be stored in a physical address space managed by an operating system on the server and which is sent from the server via the first type interface, and (2) a second portion of the storage areas of the memory to allocate for caching data, which is sent from the server to a logical volume of the storage system via the second type interface and which is to be stored in a storage device of the storage system corresponding to the logical volume.

In some embodiments, the plurality of instructions further comprise instructions that cause the data processor to manage capacity information for each media type of the memory in the storage system, wherein the memory includes at least one of DRAM memory or Flash memory. The plurality of instructions further comprise instructions that cause the data processor, if a remote memory interface of the server for communicating with the first type interface is stopped, to remove the server from an entry of a server memory allocate table which stores information on allocated memory by the storage system for one or more servers. The plurality of instructions further comprise instructions that cause the data processor, in response to a remote memory binding request with one of required capacity and memory performance or memory assign location range of the first portion of storage areas of the memory from the server, to return memory binding result with mapped address information to the server. The plurality of instructions further comprise instructions that cause the data processor, in response to a remote free request from the server, to remove the server from an entry of a server memory allocate table which stores information on allocated memory by the storage system for one or more servers.

These and other features and advantages of the present invention will become apparent to those of ordinary skill in the art in view of the following detailed description of the specific embodiments.

BRIEF DESCRIPTION OF THE DRAWINGS

FIG. 10 shows an example of the device discovery table in the host server.

FIG. 11 shows an example of the address mapping table in the host server.

FIG. 12 shows an example of the memory partition table in the storage.

FIG. 13 shows an example of the server memory allocate table in the storage.

DETAILED DESCRIPTION OF THE INVENTION

Figure 1:
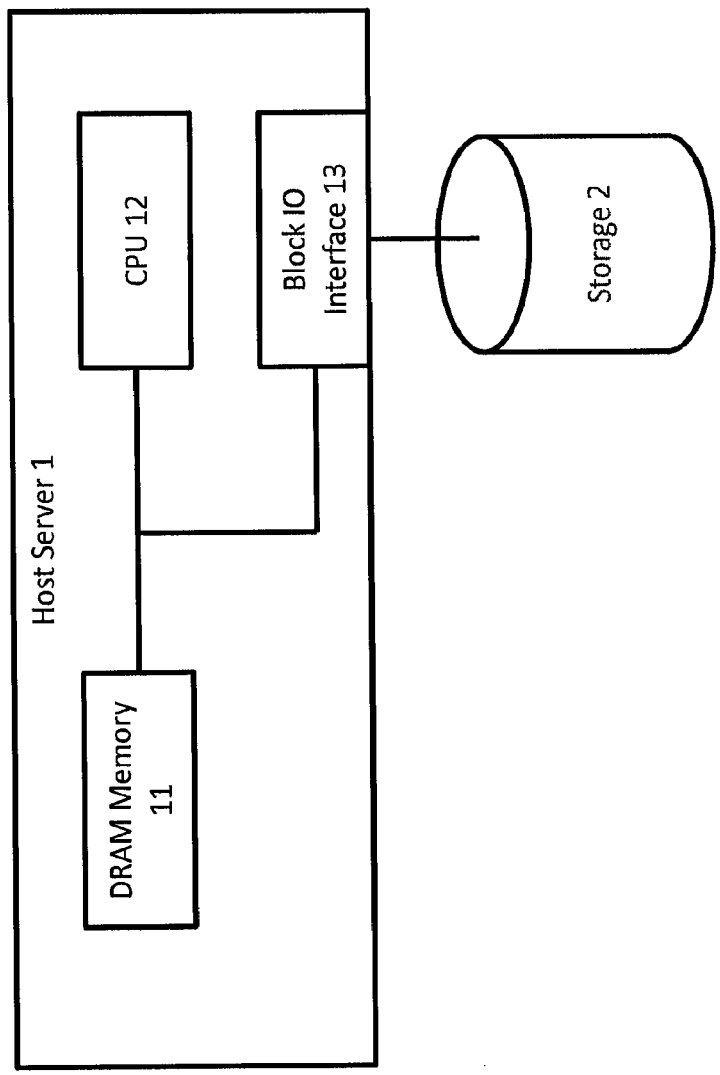
FIG. 1 illustrates an Example of a hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for hierarchy memory management between server and storage system using RDMA technology.

FIG. 1 illustrates an example of a hardware configuration of a system in which the method and apparatus of the invention may be applied. The system represents a computer environment having a host server 1 and a storage 2. The server 1 and storage 2 are connected by block I/O interface 13 such as SCSI (small computer system interface). The host server 1 has a DRAM memory 11 for storing server memory data and a processor 12.

Figure 2:
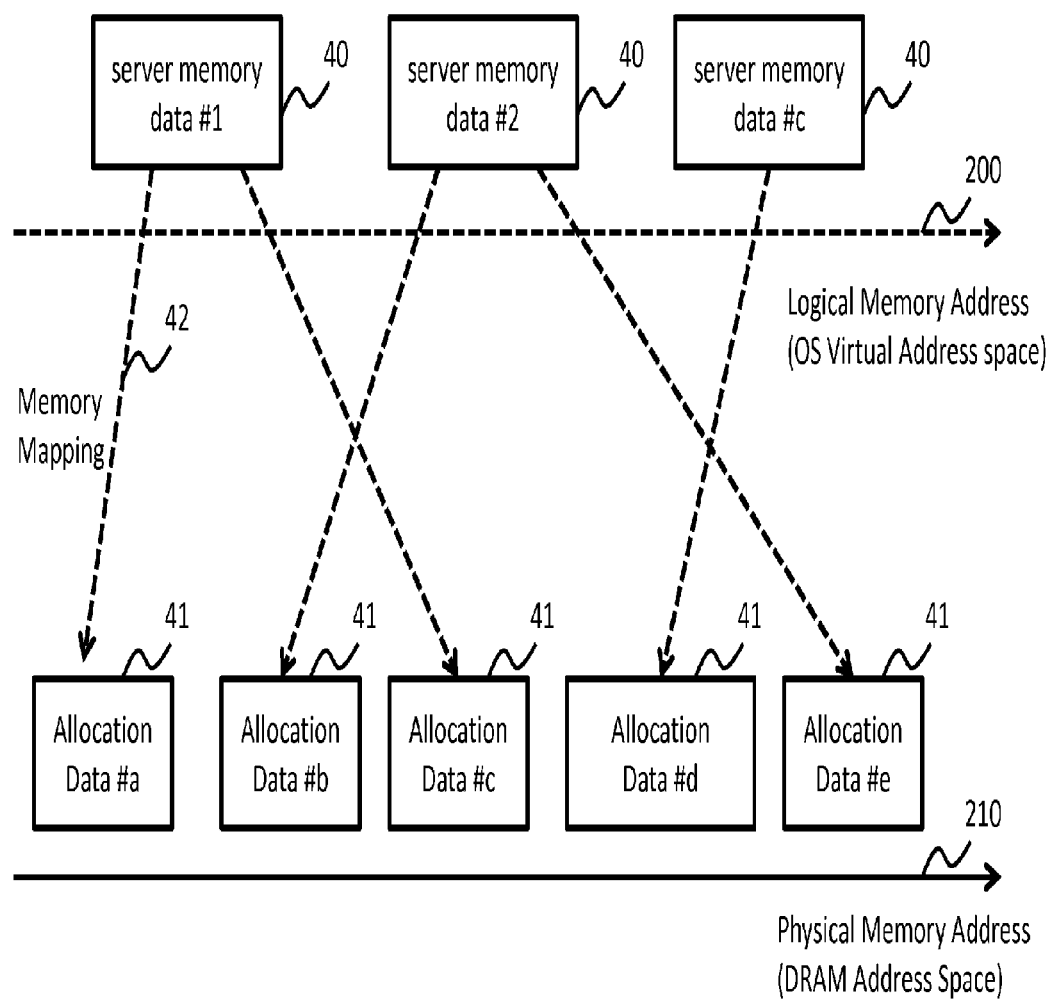
FIG. 2 shows an example of memory address mapping for the configuration of FIG. 1.

FIG. 2 shows an example of memory address mapping for the configuration of FIG. 1. The server OS (Operation System) has virtual memory address space 200. The server OS manages to map OS between the virtual memory address space 200 and the DRAM physical address space 210. When the server OS allocates memory in the virtual memory address, the allocator program of the server OS gathers some segments of the physical address space 210 and maps them to one contiguous server memory data segment. The server memory data 40 is one contiguous memory segment in the virtual address space 200. The allocation data 41 is the actual memory segment of the server memory data 40 in the physical address space 210. The server memory data 40 is mapped to one or multiple segments of the allocation data 41.

Figure 3:
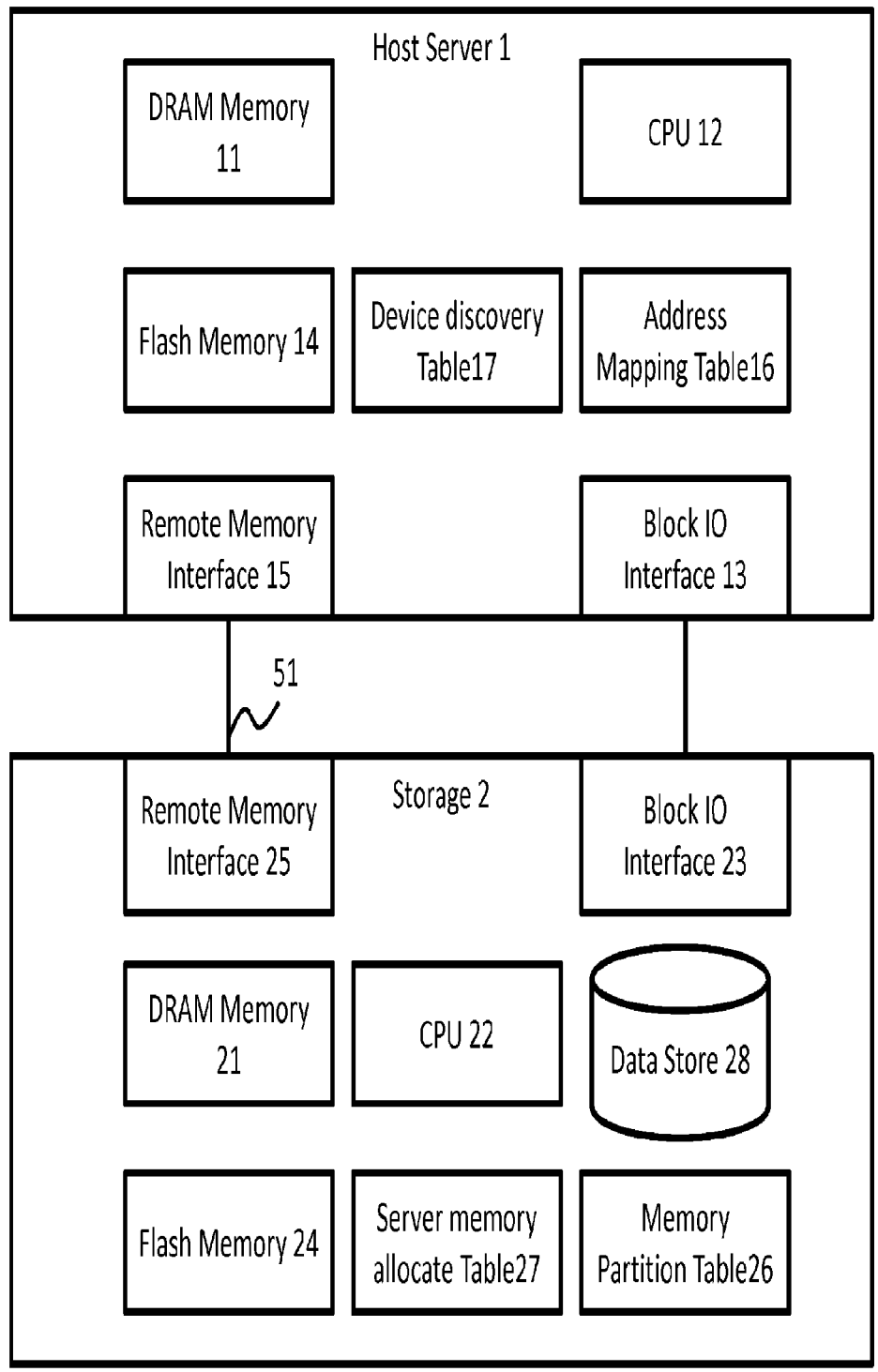
FIG. 3 shows an example of a detailed configuration of the system of FIG. 1.

FIG. 3 shows an example of a detailed configuration of the system of FIG. 1. The host server 1 includes processor 12, DRAM memory 11 for server memory data, Flash memory 14 for server memory data, and address mapping table 16 for management of local and remote hierarchy memory address space. The host server 1 has remote memory interface 15 for access remote hierarchy memory address space, and block I/O interface 13 for access data store in the storage 2. The storage 2 includes processor 22, data store 28, DRAM memory 21 for hierarchy memory space and cache memory of the storage data store 28, Flash memory 24 for hierarchy memory space and cache memory of the storage data store 28, remote memory interface 25, block I/O interface 23, memory partition table 26 for partitioning DRAM/Flash memory of the storage 2 to area of server storage data and area of storage cache memory, and server memory allocate table 27.

Figure 4:
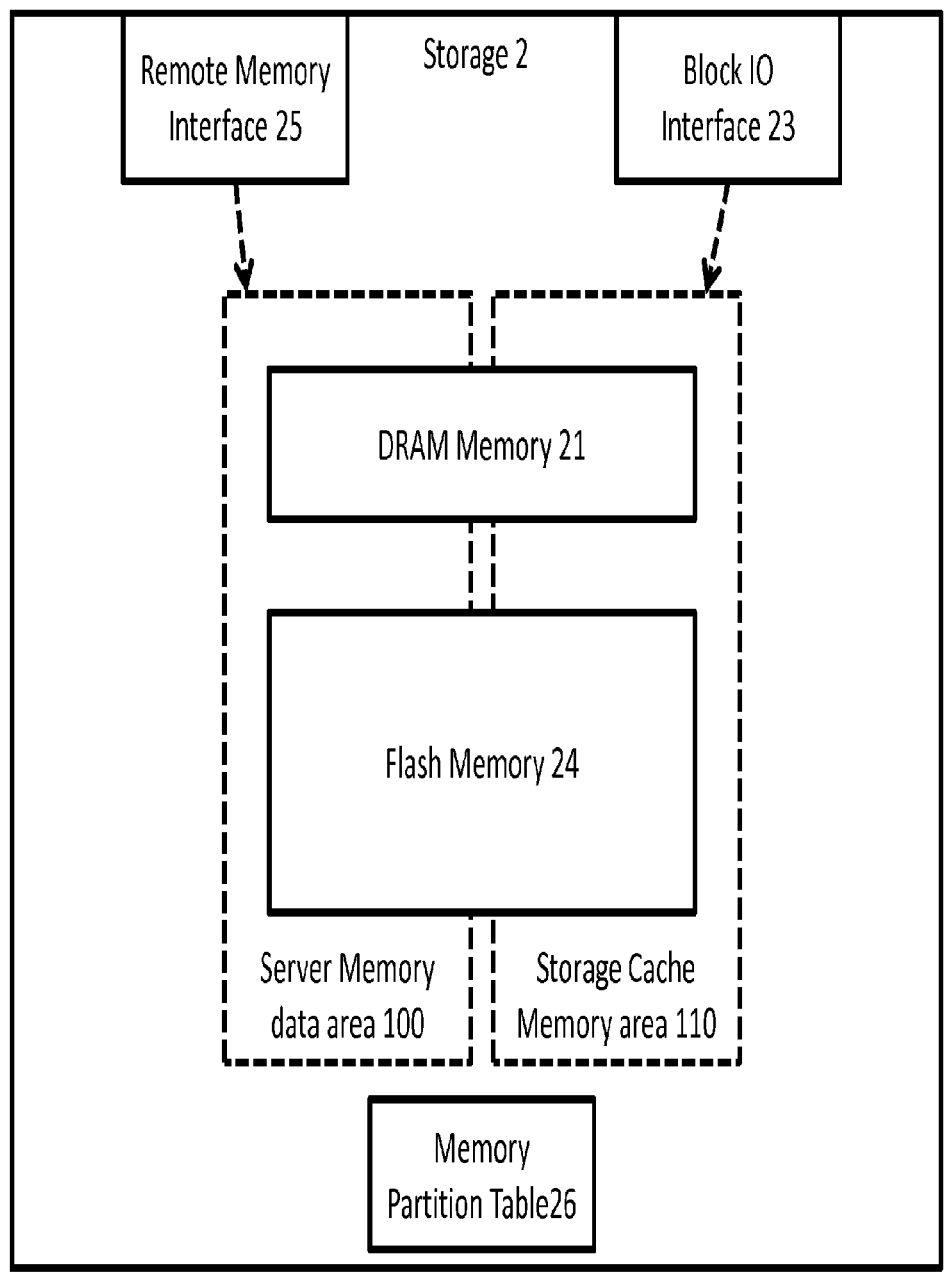
FIG. 4 shows an example of memory partition in the storage system.

FIG. 4 shows an example of memory partition in the storage system. The storage system 2 has a large capacity of DRAM memory 21 and Flash memory 24. The memory partition table 26 manages to divide the storage cache memory area 110 for storage block access data caching and server memory data area 100 for server physical memory address space.

Figure 5:
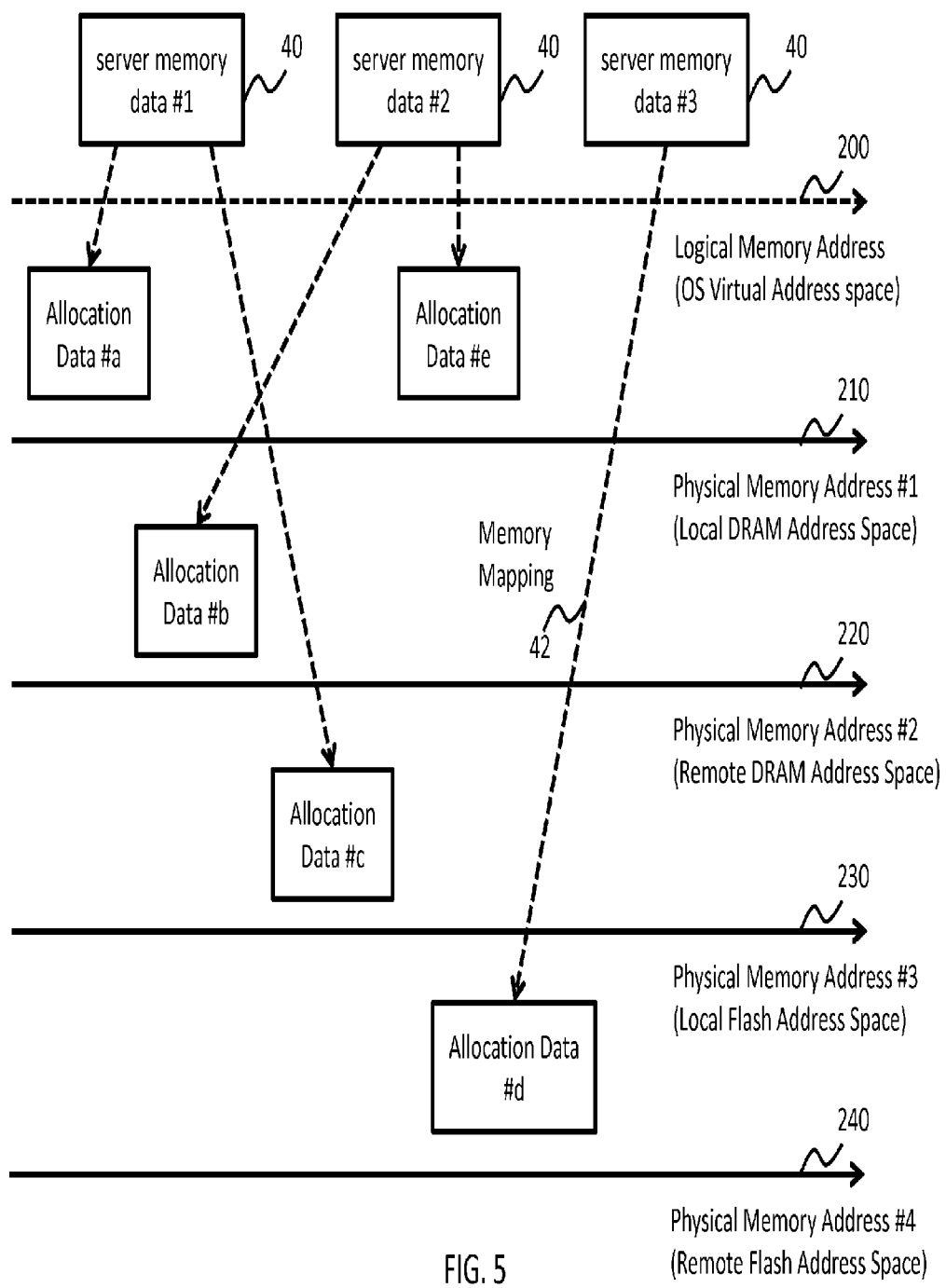
FIG. 5 shows an example of memory address mapping for DRAM and Flash memory hierarchy and remote access for the configuration of FIGS. 3 and 4.

FIG. 5 shows an example of memory address mapping for DRAM and Flash memory hierarchy and remote access for the configuration of FIGS. 3 and 4. When the host allocates the server memory data 40 in the logical memory address space (OS virtual address space), the host OS maps to the local DRAM or PRAM memory address space 210, remote DRAM or PRAM address space 220, local flash address space 230, or remote flash address space 240. When the host server 1 allocates the server memory data 40, the host OS issues a memory allocation system call based on the required highest access frequency to the local DRAM memory 21. When the host OS or application does not require highest performance for memory access, the host OS allocates the server memory data area to Flash memory 24 or remote DRAM address space 220 or remote Flash memory address space 240. The host OS manages the address mapping table 16 to allocate region of the physical memory address space (210-240).

Figure 6:
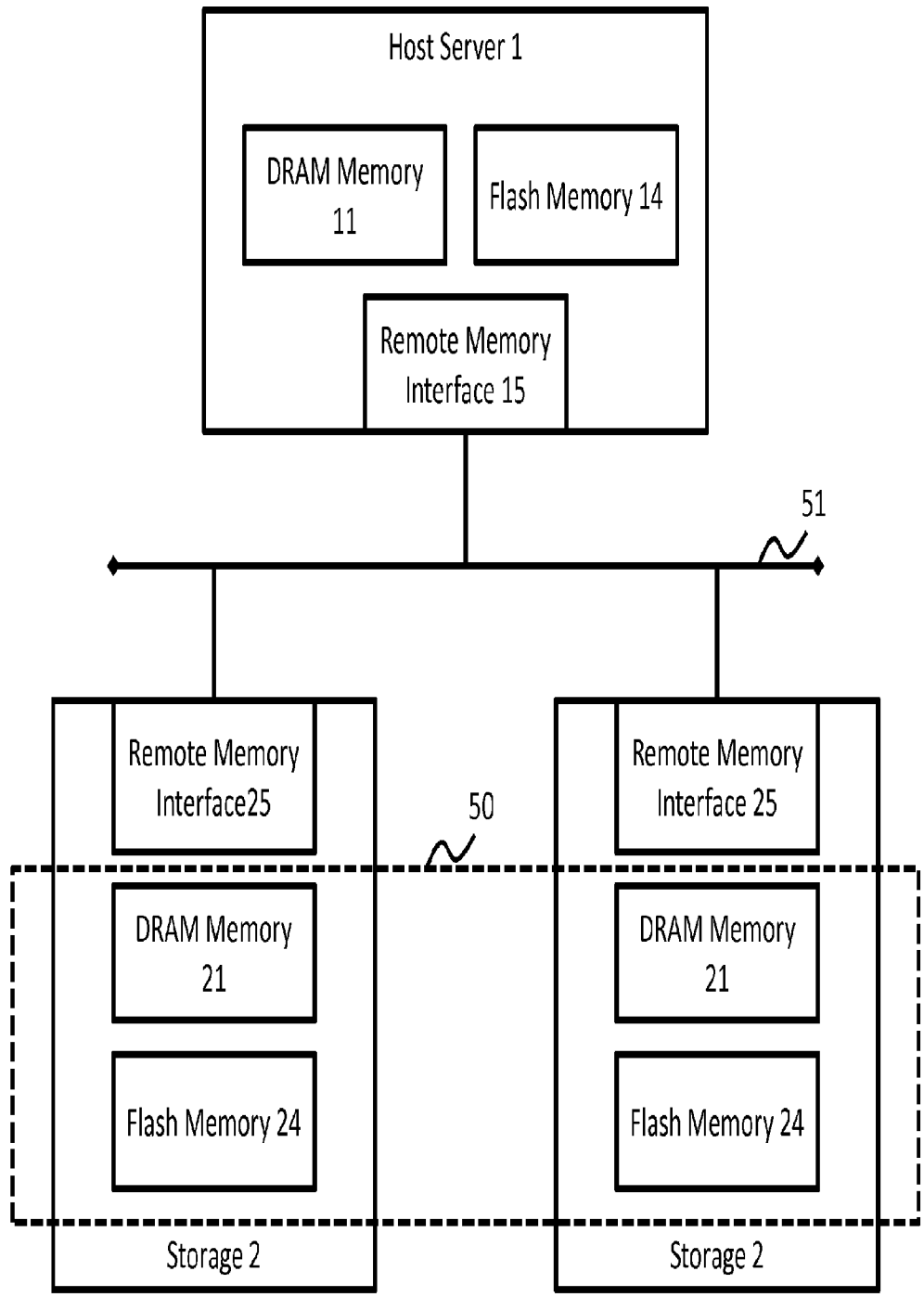
FIG. 6 shows an example of a hardware configuration of a system having multiple storage systems.

FIG. 6 shows an example of a hardware configuration of a system having multiple storage systems. In this computer environment, the server 1 has the same composition as that in FIG. 3, and each storage 2 has the same composition as that in FIG. 3. This embodiment involving multiple storage systems creates a "distributed physical address space" 50 of server memory data using storage DRAM memory 21 and storage Flash memory 24. The distributed physical address space 50 is separated from the storage cache memory space in each of the multiple storage systems 2.

Figure 7:
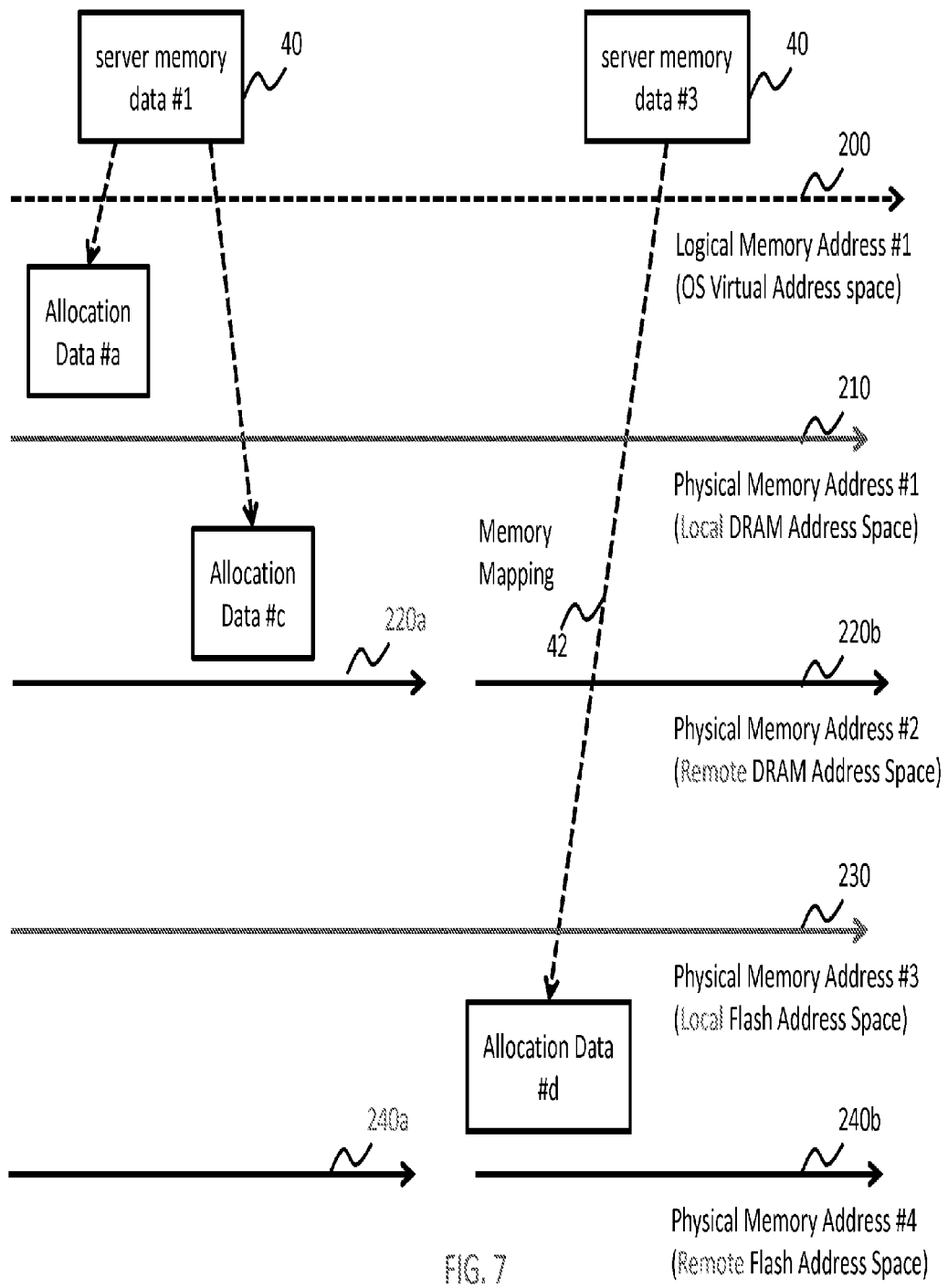
FIG. 7 shows an example of memory address mapping for DRAM and Flash memory hierarchy and remote access for the configuration of FIG. 6.

FIG. 7 shows an example of memory address mapping for DRAM and Flash memory hierarchy and remote access for the configuration of FIG. 6. The physical memory address space 220 of remote DRAM address space and the physical memory address space 240 of remote Flash address space are shared by logical memory address 200 of the host 40. There are one logical memory addresses #1 200, separate remote DRAM address spaces 220a, 220b, and separate remote Flash address spaces 240a, 240b.

Figure 8:
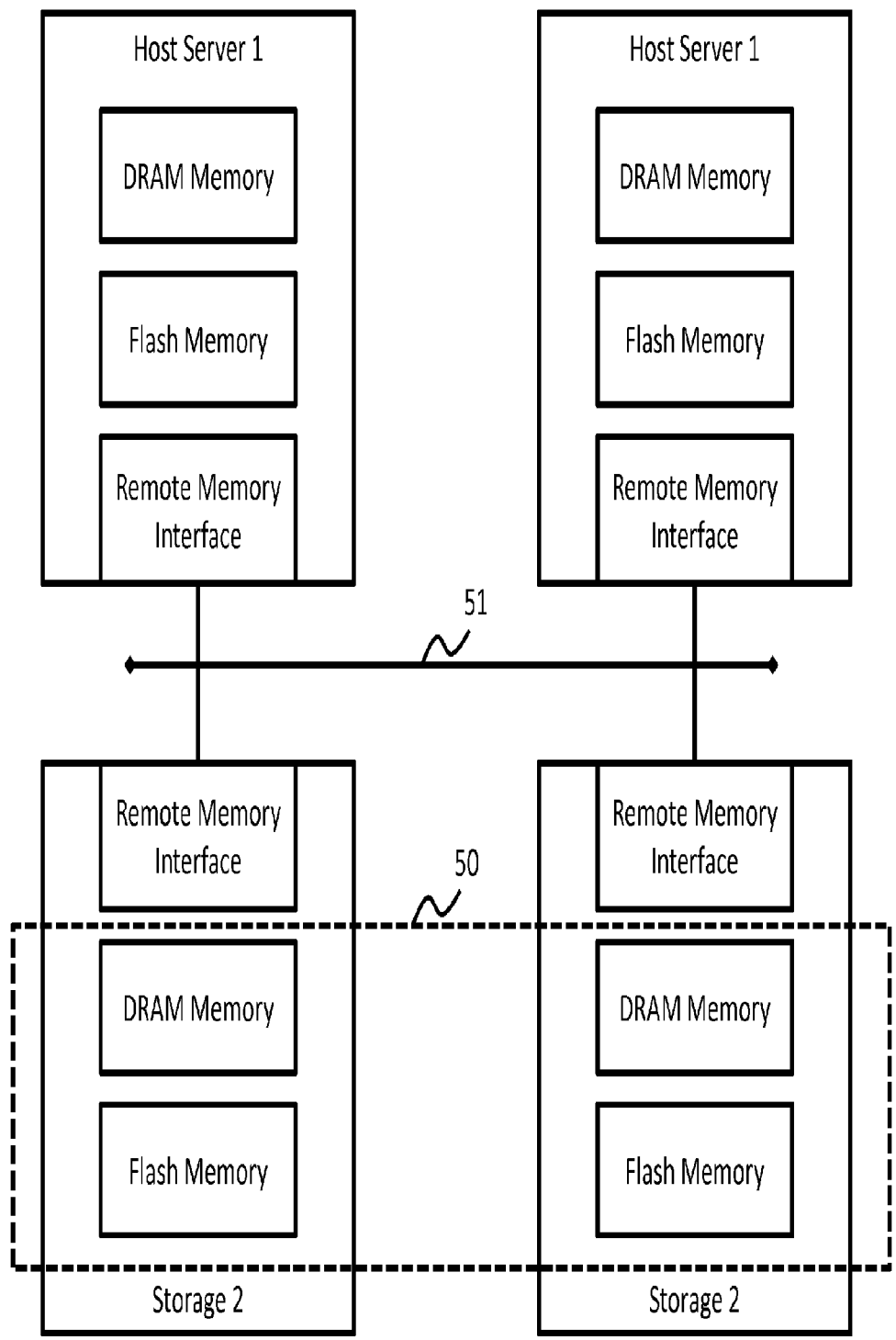
FIG. 8 shows an example of a hardware configuration of a system having multiple servers and multiple storage systems.

FIG. 8 shows an example of a hardware configuration of a system having multiple servers and multiple storage systems. In this computer environment, the multiple servers 1 share the distributed physical address space 50 as a server memory capacity pool.

Figure 9:
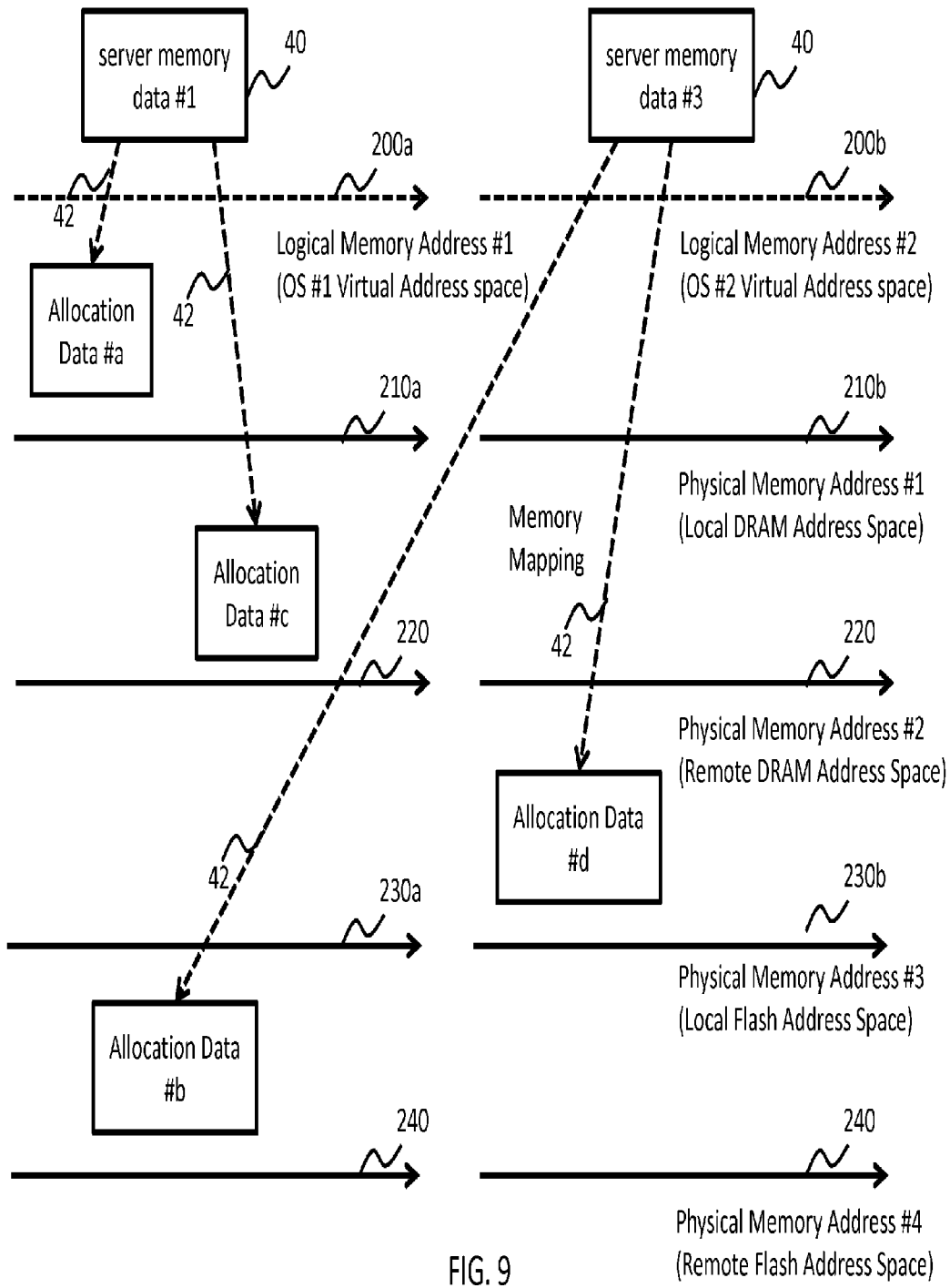
FIG. 9 shows an example of memory address mapping for DRAM and Flash memory hierarchy and remote access for the configuration of FIG. 8.

FIG. 9 shows an example of memory address mapping for DRAM and Flash memory hierarchy and remote access for the configuration of FIG. 8. The physical memory address space 220 of remote DRAM address space and the physical memory address space 240 of remote Flash address space are shared by multiple logical memory addresses 200a and 200b of the two hosts. There are separate logical memory addresses #1 200a and #2 200b, separate local DRAM address spaces 210a, 210b, and separate local Flash address spaces 230a, 230b.

FIG. 10 shows an example of the device discovery table 17 in the host server 1. Remote Device field 91 is local address (local RAM or Flash memory) or identification of remote memory device such as Inifiniband® name identifier. Memory Device Type field 92 contains media type of memory such as DRAM, PRAM, or Flash. Assigned capacity field 93 contains local or remote assigned capacity that is allocated by server of physical memory address space.

FIG. 11 shows an example of the address mapping table 16 in the host server 1. Virtual memory address field 101 is address space of host OS virtual address space 200. Remote Device field 102 is local address (local RAM or Flash memory) or identification of remote memory device such as Inifiniband® name identifier. Memory Device Type field 103 contains media type of memory such as DRAM, PRAM, or Flash. Physical Memory address field 104 contains local or remote physical memory address.

FIG. 12 shows an example of the memory partition table 26 in the storage 2. The memory partition table 26 divides DRAM memory or Flash memory of storage to server memory data area and storage cache data area. Physical Memory address field 111 contains physical memory address of the storage Flash or storage DRAM memory. Memory Device Type field 112 contains media type of memory such as DRAM, PRAM, or Flash. Partition Type field 113 contains memory area type of storage cache memory area or server memory data area. Remote Device field 114 contains identification of remote host server such as Inifiniband® name identifier.

FIG. 13 shows an example of the server memory allocate table 27 in the storage 2. The server memory allocate table 27 enables to share physical address space of server memory data amongst multiple servers. Remote Device field 121 contains identification of remote host server such as Inifiniband® name identifier. Memory Device Type field 122 contains local resource media type of memory such as DRAM, PRAM, or Flash. Physical Memory address field 123 contains local physical memory address.

Figure 14:
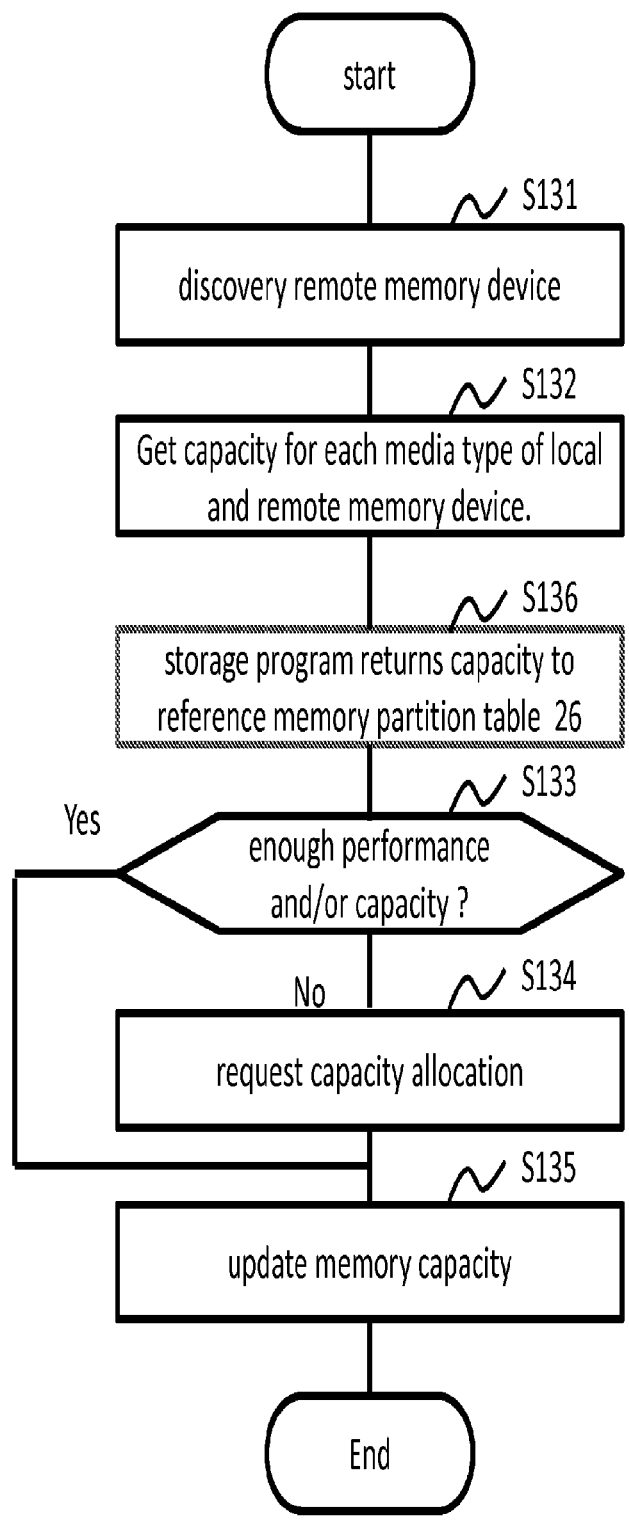
FIG. 14 is an example of a flow diagram illustrating a process flow of the memory device discovery and initialization process.

FIG. 14 is an example of a flow diagram illustrating a process flow of the memory device discovery and initialization process. When the network 51 detects a new server or storage device, the network 51 notifies all devices. Then the host server 1 discovers a new storage device 2 that has remote memory device capability (step S131). The host server 1 adds the remote memory device resource to the remote device entry 91 of the device discovery table 17 (FIG. 10). In step S132, the host server 1 gets the capacity information for each media type for each new discovery remote memory device, and constructs the memory type entry 92 and assigned capacity entry 93 of the device discovery table 17. In step S136, the storage 2 returns capacity information to the reference memory partition table 26. The memory partition table contains available capacity of remote physical memory that the host uses to remote physical memory. In S136, the storage returns capacity information of the remote physical memory. In step S133, the host server 1 determines which host server has enough memory capacity or memory performance. If the capacity or performance is enough (YES), the program skips step S134 and proceeds to step S135. Otherwise, the program performs step S134, in which the host server 1 requests more capacity allocation to a specific memory type. When the storage 2 receives the request, the storage 2 returns good result with memory type and allocation capacity. If the storage 2 does not have more resources to allocate any capacity to the host server, then the storage returns a bad status with a lack of capacity error. In step S135, the host OS updates the memory capacity. The host OS dynamically updates the physical capacity without OS reboot or shutdown process.

Figure 15:
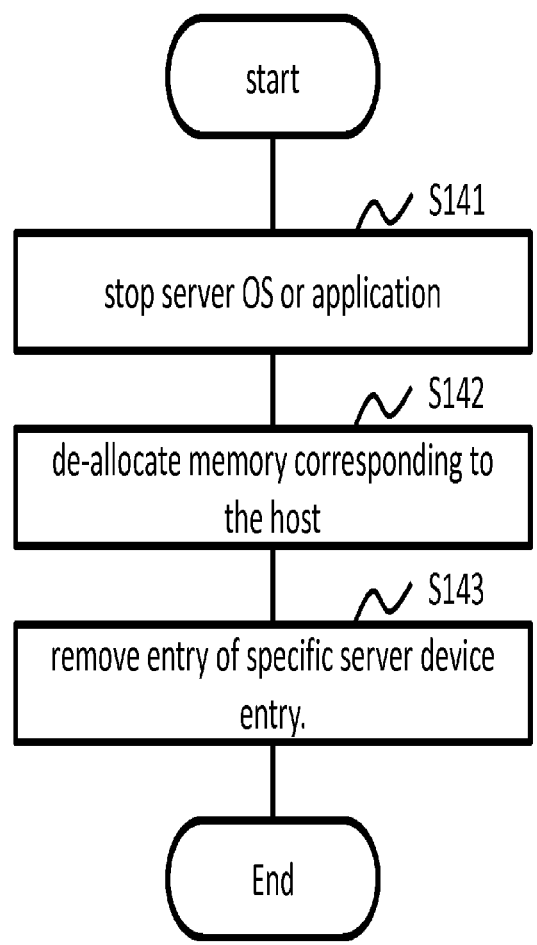
FIG. 15 is an example of a flow diagram illustrating a process flow of the memory device discovery and initialization process.

FIG. 15 is an example of a flow diagram illustrating a process flow of the memory device discovery and initialization process. In step S141, the administrator stops the server OS or the application program running the host serve 1 issues a free memory call. In step S142, the storage 2 de-allocates the memory corresponding to the host server. In step S143, if the remote memory interface of the host server 1 is stopped, the storage 2 removes entry of the specific server device (Remote Device) entry of the server memory allocate table 27 (FIG. 13).

Figure 16:
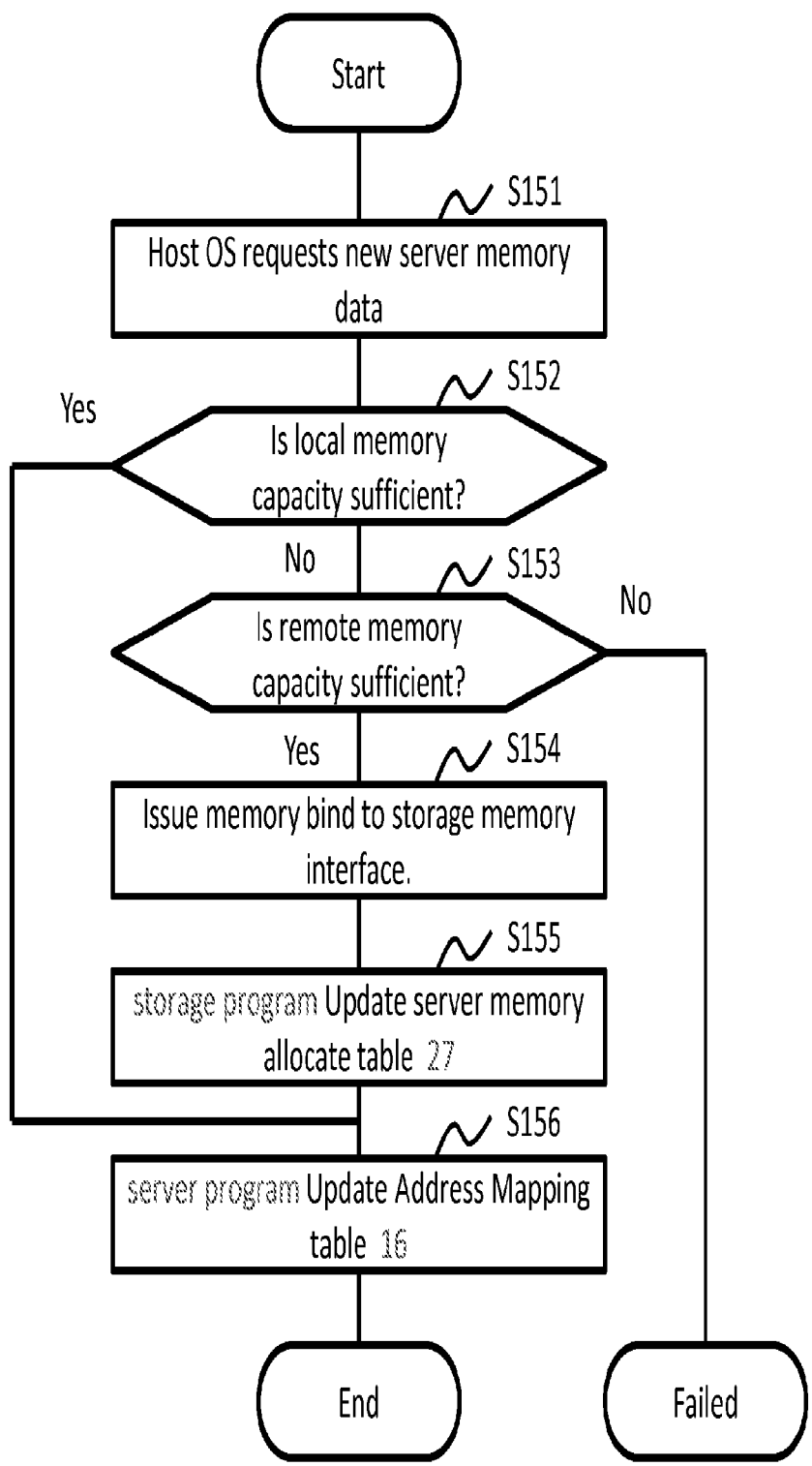
FIG. 16 is an example of a flow diagram illustrating a process flow of server memory allocation.

FIG. 16 is an example of a flow diagram illustrating a process flow of server memory allocation (alloc). In step S151, the host OS requests new server memory data. The application of the host 1 issues a memory allocation system call to the host OS. In step S152, if the local memory of the host server has sufficient capacity (YES), then the host OS allocates local memory and proceeds to step S156. If the local memory of the host server does not have sufficient capacity or the higher performance memory capacity such as DRAM is insufficient (NO), then the program performs steps S153 to S155 before step S156.

In step S153, the host server 1 checks the remote memory capacity using the device discovery table 17. If remote memory is available (YES), then the next step is S154. If remote memory is not available (NO), then memory allocation has failed and the host OS requires a swap operation to expand capacity of total memory. The swap operation is virtual memory address map to memory data move to file block and store to data store of block storage. In step S154, the host memory issues a remote memory binding request such as RDMA operation memory allocation functionality to the storage memory interface. The host requests memory binding with required capacity and memory performance or memory assign location range of remote DRAM area or remote Flash area. In step S155, the storage 2 updates the server memory allocation table 27 and returns physical memory of remote DRAM or Flash address space which host requests specific performance or remote memory address space. The storage returns memory binding result with mapped address information. In step S156, the host OS updates the address mapping table 16 to allocate local or remote memory. Application is used to access the server memory data that is mapped to local memory area, or remote memory area using RDMA.

Figure 17:
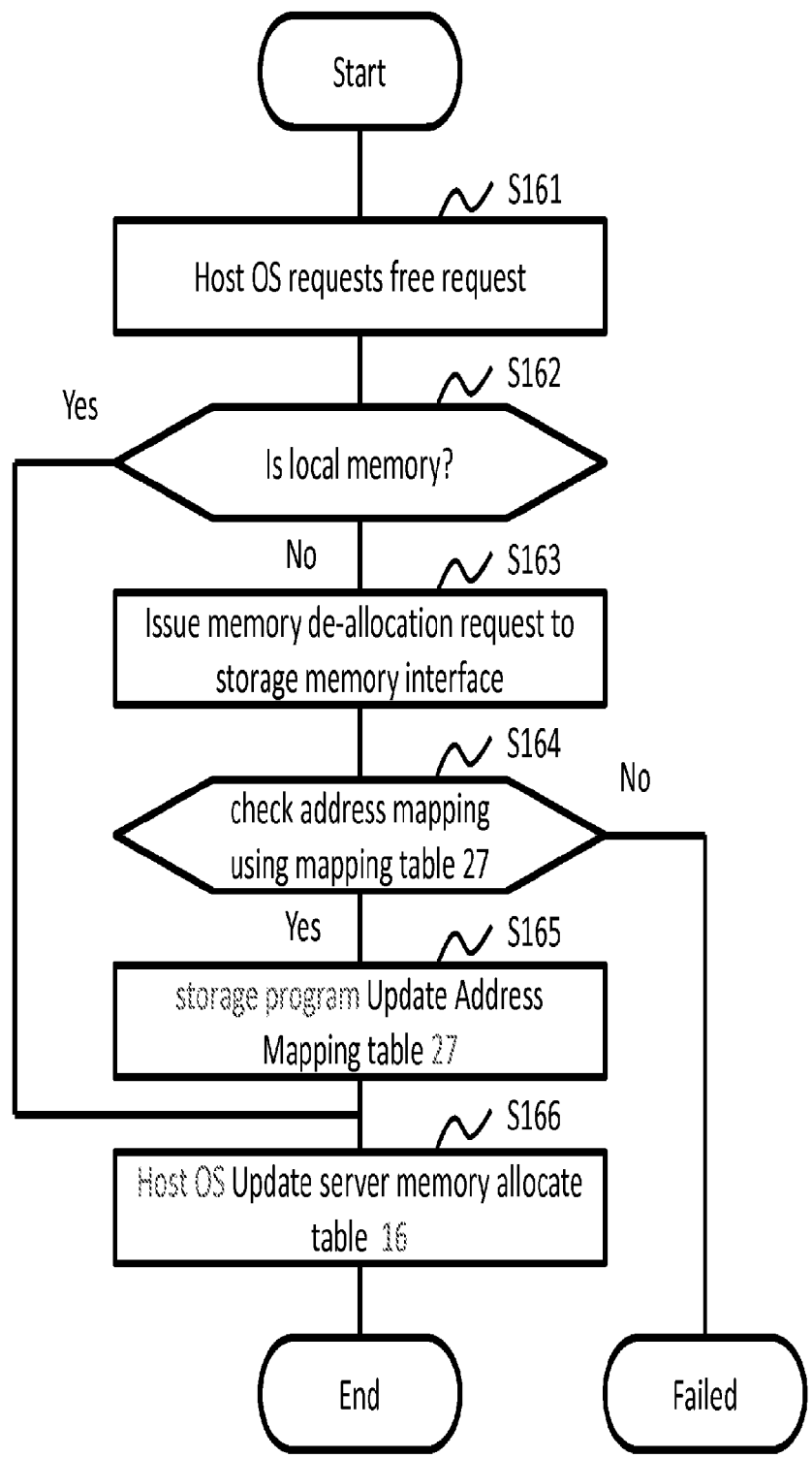
FIG. 17 is an example of a flow diagram illustrating a process flow of server memory de-allocation (free) system call.

FIG. 17 is an example of a flow diagram illustrating a process flow of server memory de-allocation (free) system call. In step S161, the host OS requests to free server memory data. Application of the host 1 issues a memory de-allocation (memory free) system call to the host OS. In step S162, if the allocation area is local memory of the host server (YES), then the host OS de-allocates the local memory and proceeds to step S166. If the allocation area is remote memory (NO), then the program performs steps S163 to S165 before steps S166.

In step S163, the host memory issues a remote memory free request to the remote memory interface 25 of the storage 2. In step S164, the storage 2 checks the remote memory capacity using the device discovery table 17. If the remote memory is allocated (YES), then the next step is S165. If the remote memory is not allocated (NO), then the memory free request has failed due to memory address violation. The remote memory interface 25 of the storage 2 returns result with memory violation error response, and then the host OS performs memory error handling. In step S165, the storage 2 updates the server memory allocation table 27 to remove specific entry and return result of memory free request. In step S166, the host OS updates the address mapping table 16 to remove specific remote memory allocation entry, and then to de-allocate local or remote memory. The virtual memory address space of host server cleanup server memory data.

Figure 18:
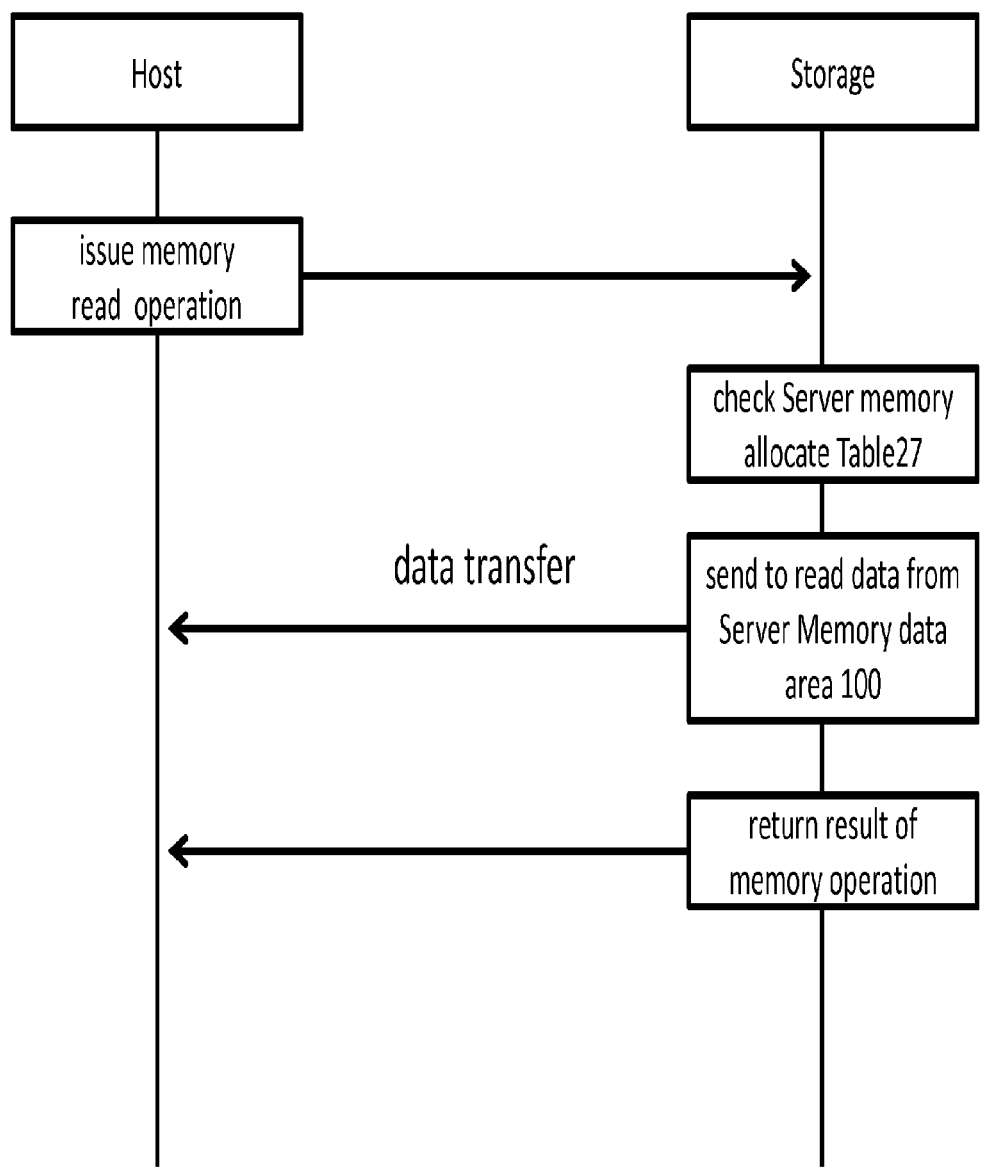
FIG. 18 is an example of a flow diagram illustrating a memory read operation.

FIG. 18 is an example of a flow diagram illustrating a memory read operation. The host 1 issues a memory read operation to the storage 2. The storage checks the server memory allocate table 27 for the allocated physical address 123, sends the read data from the server memory data area 100 to the host, and returns result of the memory read operation to the host. The data transfer from the storage to the host occurs when the storage sends the read data from the server memory data area 100 to the host.

Figure 19:
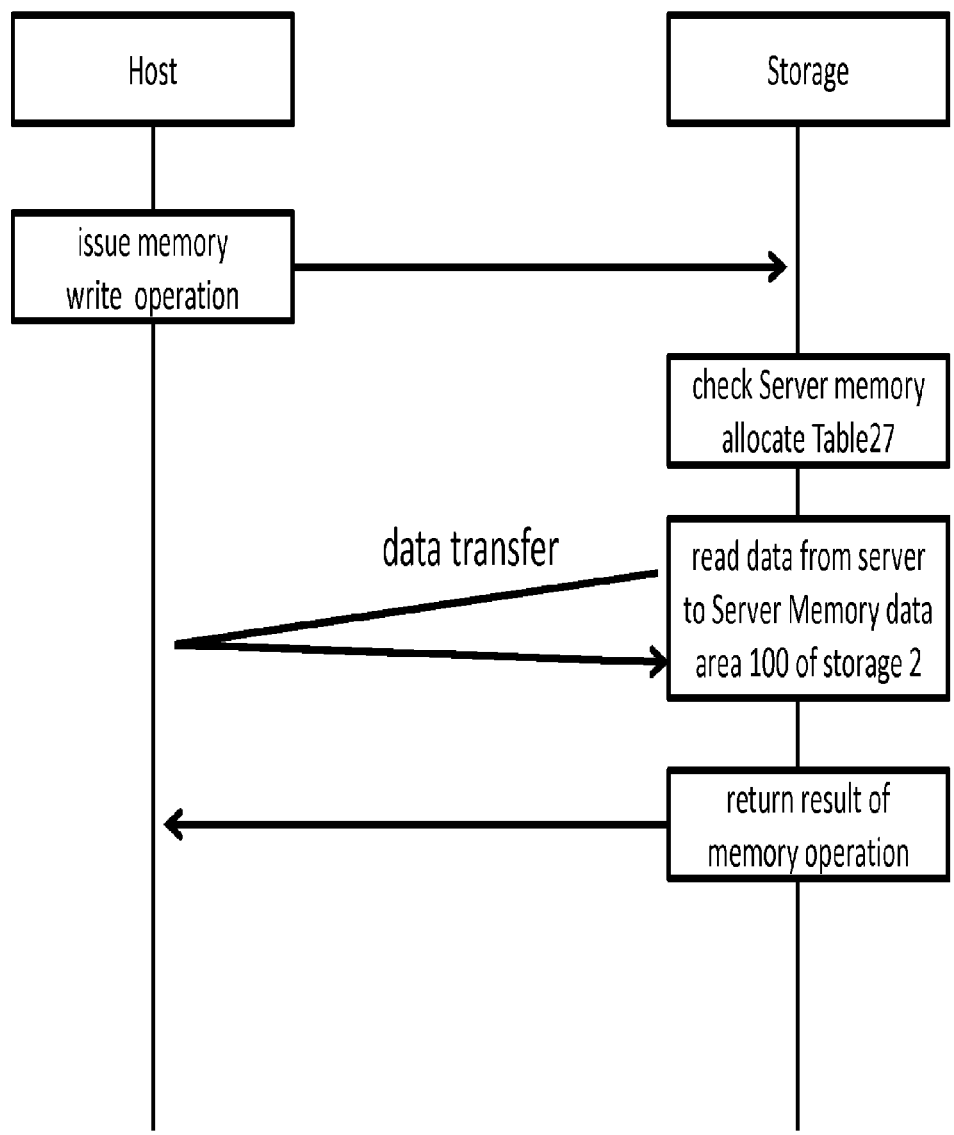
FIG. 19 is an example of a flow diagram illustrating a memory write operation.

FIG. 19 is an example of a flow diagram illustrating a memory write operation. The host 1 issues a memory write operation to the storage 2. The storage checks the server memory allocate table 27 for the allocated physical address 123, reads data from the host to the server memory data area 100 of the storage, and returns result of the memory write operation to the host. The data transfer from the storage to the host and back to the storage occurs when the storage reads data from the host to the server memory data area 100 of the storage. This flow is for "server write memory data in the server local memory to remote memory." The server issues a memory write command to the storage via the RDMA interface. In the next step, the storage receives the RDMA memory write command. The storage checks the server memory allocate table 27 for the allocated physical address 123. Then, the storage gets (read) write data which has already existed in the server local memory (host write data). The RDMA data transfer operation is initiated by the target. The host sends write memory data to the storage. The storage performs the RDMA write operation to read the host local memory data.

Figure 20:
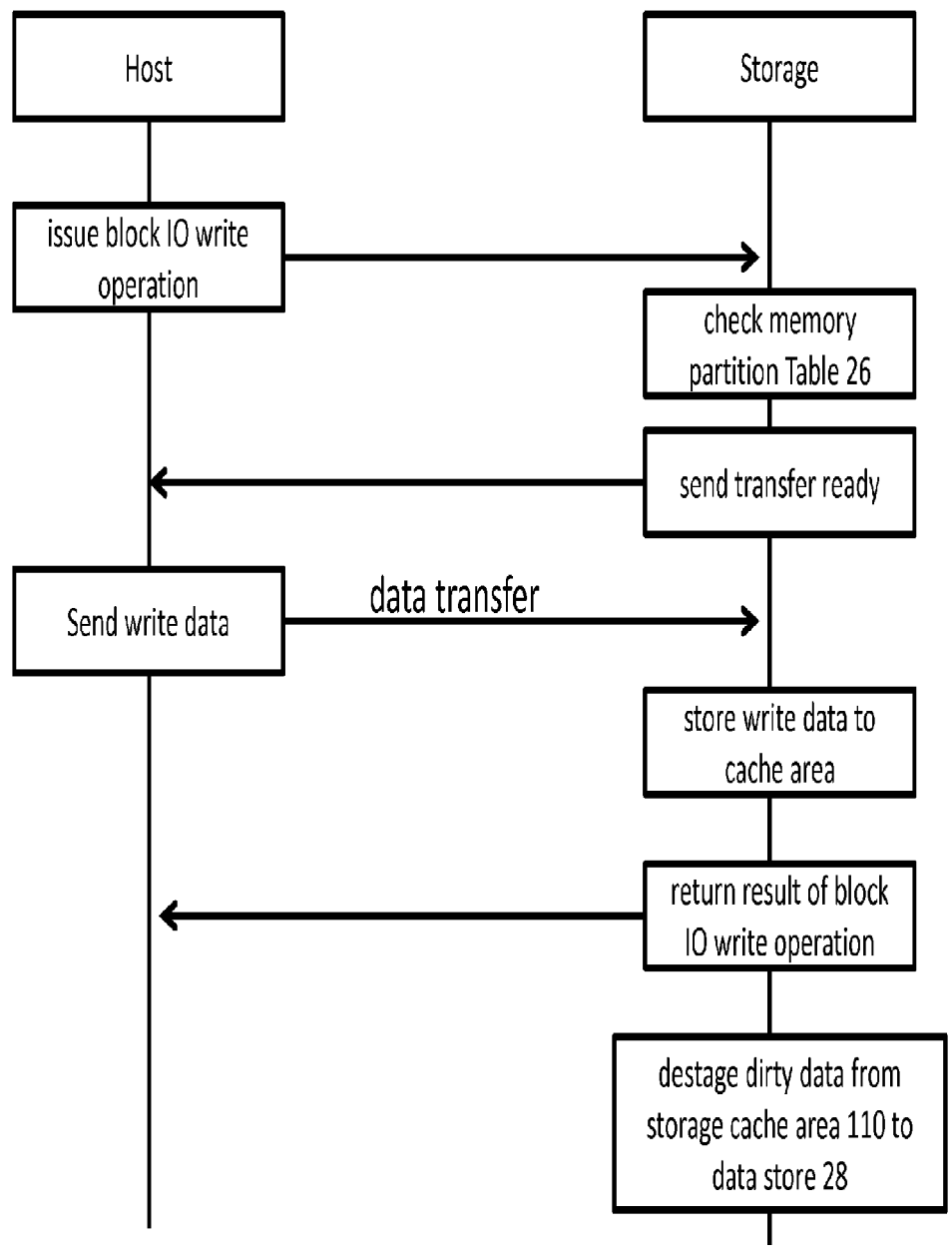
FIG. 20 is an example of a flow diagram illustrating a block I/O write operation.

FIG. 20 is an example of a flow diagram illustrating a block I/O write operation. The host 1 issues a block I/O write operation to the storage 2. The storage checks the memory partition table 26 for the partition type 113 (storage cache) and the physical memory address 111, and notifies the host 1 when it is ready for data transfer. In response, the host sends write data to the storage. The storage stores the write data to the storage cache area 110, returns result of the block I/O write operation to the host, and destages dirty data from the storage cache area 110 to the data store 28. The data transfer from the host to the storage occurs when the host sends the write data to the storage.

Figure 21:
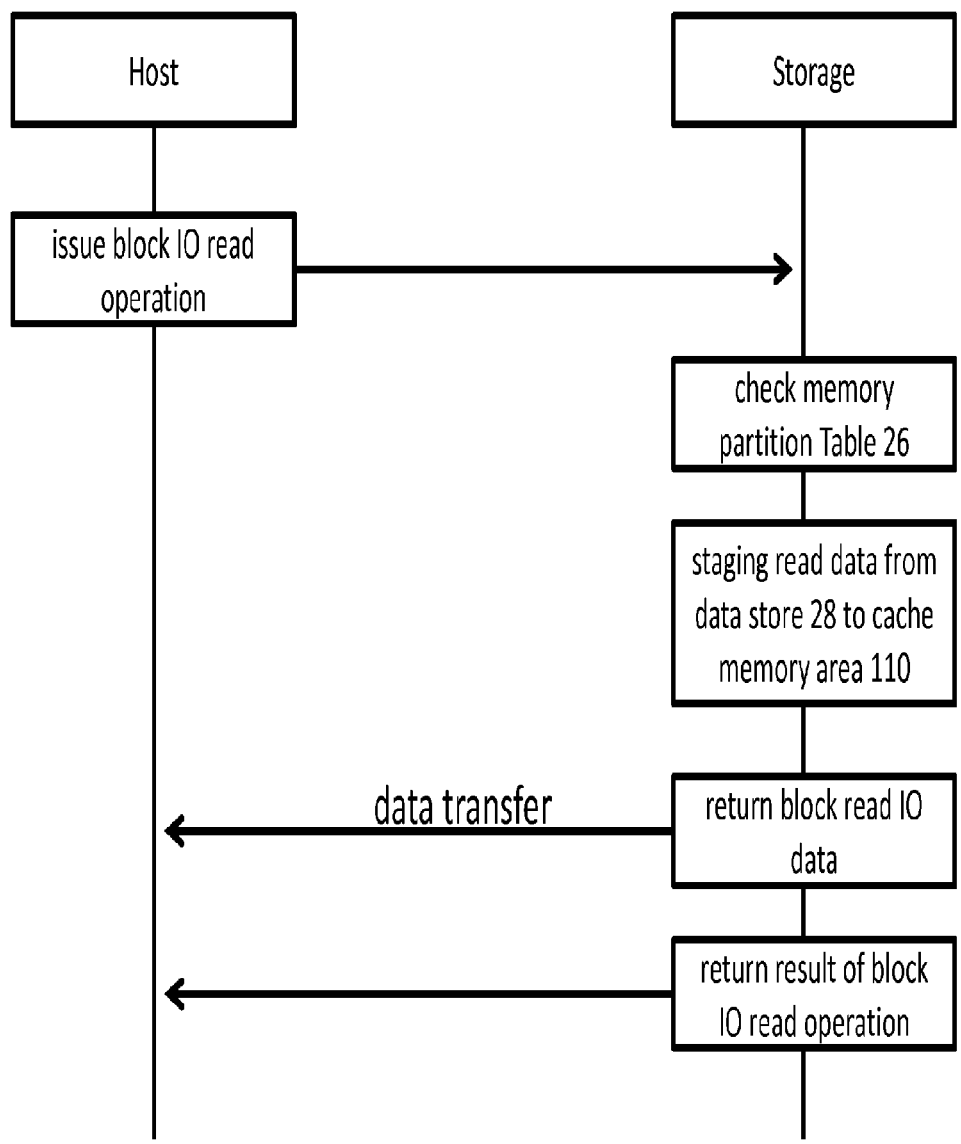
FIG. 21 is an example of a flow diagram illustrating a block I/O read operation.

FIG. 21 is an example of a flow diagram illustrating a block I/O read operation. The host 1 issues a block I/O read operation to the storage 2. The storage checks the memory partition table 26 for the partition type 113 (storage cache) and the physical memory address 111, performs staging of read data from the data store 28 to the cache memory area 110, sends block read I/O data to the host, and returns result of the block I/O read operation to the host. The data transfer occurs from the storage to the host when the storage returns block read I/O data to the host.

Of course, the system configurations illustrated in FIGS. 1, 6, and 7 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for hierarchy memory management between server and storage system using RDMA technology. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system which is coupled with a server having a first memory and a processor executing an operating system and an application, the storage system comprising:
   a second memory including a lower performance memory and a higher performance memory which has a higher memory performance than the lower performance memory, the higher performance memory and the lower performance memory representing two memory types; and
   a controller being operable to manage (1) a first portion of storage areas of the second memory to allocate for storing at least a part of server memory data, which is to be stored in a physical address space of the second memory, the physical address space being managed by the operating system on the server, the first portion of storage areas of the second memory including a first portion of storage areas of the lower performance memory of the second memory and a first portion of storage areas of the higher performance memory of the second memory, and (2) a second portion of the storage areas of the second memory to allocate for caching block data, which is sent from the server to a logical volume of the storage system and which is to be stored in a storage device of the storage system corresponding to the logical volume, the second portion of storage areas of the second memory including a second portion of storage areas of the lower performance memory of the second memory and a second portion of storage areas of the higher performance memory of the second memory, the first portion and the second portion representing two partition types,
   wherein the first portion of storage areas of the second memory includes the first portion of storage areas of both the lower performance memory and the higher performance memory of the second memory, being managed by the controller of the storage system,
   wherein the second portion of storage areas of the second memory includes the second portion of storage areas of both the lower performance memory and the higher performance memory of the second memory, being managed by the controller of the storage system,
   wherein at least either the first portion or the second portion is shared by the server and another server,
   wherein the operating system allocates memory space to the application from a third portion of storage areas of the first memory in priority to the first portion of storage areas of the second memory, and requires a swap operation to move the server memory data to the storage device if the operating system fails to allocate the memory space to the application, and
   wherein the first portion of storage areas of the second memory is allocated from either the first portion of storage areas of the lower performance memory of the second memory or the first portion of the storage areas of the higher performance memory of the second memory, for storing the server memory data, based on performance requirement of the application for the server memory data.

2. The storage system of claim 1, further comprising:
   a first type interface being operable to communicate with the server using a remote memory access; and
   a second type interface being of a different type from the first type interface and being operable to communicate with the server using a block I/O (Input/Output) access; and
   wherein the part of server memory data is sent from the server via the first type interface, and the block data is sent from the server via the second type interface.

3. The storage system of claim 1,
   wherein the controller is operable to allocate the first portion of storage areas of the second memory to the server for storing at least the part of server memory data in response to receiving a remote memory binding request from the server.

4. The storage system of claim 3,
   wherein the controller is operable to de-allocate the first portion of storage areas of the second memory in response to receiving a de-allocation request from the server.

5. The storage system of claim 3,
   wherein the controller is operable to destage the block data cached on the second portion of storage areas of the second memory to the storage device of the storage system as a part of block IO write operation issued by the server, and
   wherein the controller is operable not to destage the part of server memory data stored on the first portion of storage areas of the second memory to the storage device of the storage system as a part of memory write operation issued by the server.

6. A system comprising:
   a server including a first memory and a processor executing an operating system and an application; and
   a storage system including a second memory including a lower performance memory and a higher performance memory which has a higher memory performance than the lower performance memory, the higher performance memory and the lower performance memory representing two memory types, and a controller being operable to manage (1) a first portion of storage areas of the second memory to allocate for storing at least a part of server memory data, which is sent from the server and which is to be stored in a physical address space of the second memory, the physical address space being managed by the operating system on the server, the first portion of storage areas of the second memory including a first portion of storage areas of the lower performance memory of the second memory and a first portion of storage areas of the higher performance memory of the second memory, and (2) a second portion of storage areas of the second memory to allocate for caching block data, which is sent from the server to a logical volume of the storage system and which is to be stored in a storage device of the storage system corresponding to the logical volume, the second portion of storage areas of the second memory including a second portion of storage areas of the lower performance memory of the second memory and a second portion of storage areas of the higher performance memory of the second memory, the first portion and the second portion representing two partition types, wherein the first portion of storage areas of the second memory includes the first portion of storage areas of both the lower performance memory and the higher performance memory of the second memory, being managed by the controller of the storage system, wherein the second portion of storage areas of the second memory includes the second portion of storage areas of both the lower performance memory and the higher performance memory of the second memory, being managed by the controller of the storage system, wherein at least either the first portion or the second portion is shared by the server and another server, and wherein the operating system is operable to allocate memory space to the application from a third portion of storage areas of the first memory in priority to the first portion of storage areas of the second memory, and require a swap operation to move the server memory data to the storage device if the operating system fails to allocate the memory space to the application, and wherein the first portion of storage areas of the second memory is allocated from either the first portion of storage areas of the lower performance memory of the second memory or the first portion of the storage areas of the higher performance memory of the second memory, for storing the server memory data, based on performance requirement of the application for the server memory data.

7. The system of claim 6, wherein the storage system further includes:
a first type interface being operable to communicate with the server using a remote memory access; and
a second type interface being of a different type from the first type interface and being operable to communicate with the server using a block I/O (Input/Output) access; and
wherein the part of server memory data is sent from the server via the first type interface, and the block data is sent from the server via the second type interface.

8. The system of claim 6,
wherein the controller is operable to allocate the first portion of storage areas of the second memory to the server for storing at least the part of server memory data in response to receiving a remote memory binding request from the server.

9. The system of claim 8,
wherein the server sends the remote memory binding request to the storage system in a case where the operating system receives a memory allocation request from the application and allocates memory space to the application from the first portion of storage areas of the second memory.

10. The system of claim 9,
wherein the storage system, in response to the remote memory binding request, returns an error response if the storage system does not have capacity of the first portion of storage areas of the second memory to allocate to the server.

11. The system of claim 8,
wherein the controller is operable to de-allocate the first portion of storage areas of the second memory in response to receiving a de-allocation request from the server.

12. The system of claim 8,
wherein the controller is operable to destage the block data cached on the second portion of storage areas of the second memory to the storage device of the storage system as a part of block IO write operation issued by the server, and
wherein the controller is operable not to destage the part of server memory data stored on the first portion of storage areas of the second memory to the storage device of the storage system as a part of memory write operation issued by the server.

13. The storage system of claim 1,
wherein the second portion of storage areas of the second memory is allocated from either the second portion of storage areas of the lower performance memory of the second memory or the second portion of the storage areas of the higher performance memory of the second memory, for caching the block data sent from the server, based on performance requirement for caching the block data.

14. The storage system of claim 1,
wherein the performance requirement includes required highest access frequency to the second memory.

15. The storage system of claim 1,
wherein the lower performance memory comprises flash memory and the higher performance memory comprises DRAM memory.

16. The storage system of claim 1,
wherein the controller is operable to manage capacity for the two memory types and the two partition types and, upon receiving a query regarding remote memory from the server, send available capacity information of the second portion and corresponding memory type information to the server.

17. The system of claim 6,
wherein the controller is operable to manage capacity for the two memory types and the two partition types and, upon receiving a query regarding remote memory from the server, send available capacity information of the second portion and corresponding memory type information to the server as remote memory information.

18. The system of claim 17,
wherein the processor of the server is operable to allocate memory space based on the remote memory information received from the controller of the storage system.

19. The system of claim 17,
wherein the processor of the server is operable to manage address mapping information including correspondence between virtual memory address, the memory type, and physical memory address of the second memory.

20. The system of claim 19,
wherein the processor of the server is operable to allocate memory space based on the remote memory information received from the controller of the storage system and update the address mapping information.

* * * * *